United States Patent [19]

Prosky

[11] 4,159,648
[45] Jul. 3, 1979

[54] ELECTRICAL CIRCUIT BOARD WITH DIRECTLY ATTACHED DISPLAY UNIT AND METHOD OF ASSEMBLING SAME

[75] Inventor: Howard S. Prosky, Arapahoe County, Colo.

[73] Assignee: Electromedics, Inc., Denver, Colo.

[21] Appl. No.: 848,090

[22] Filed: Nov. 3, 1977

[51] Int. Cl.² .............................................. G01K 7/00
[52] U.S. Cl. .................................. 73/362 AR; 357/80; 361/400
[58] Field of Search ....... 73/362 R, 362 AR, 362 SC; 250/552, 553; 324/96, 122; 340/378 R; 357/80; 361/400, 401

[56] References Cited

U.S. PATENT DOCUMENTS

| | | | |
|---|---|---|---|
| 3,435,449 | 3/1969 | Sloan | 361/400 X |
| 3,614,759 | 10/1971 | Moore et al. | 340/366 E X |
| 3,780,430 | 12/1973 | Feeney | 29/626 |
| 3,795,863 | 3/1974 | Umeda et al. | 340/378 R X |

*Primary Examiner*—Charles A. Ruehl
*Attorney, Agent, or Firm*—Gary M. Polumbus

[57] ABSTRACT

A display unit having a plurality of light emitting segments is directly attached to a circuit board, thereby avoiding use of a separate encapsulated display device. The circuit board is provided with a plurality of electrical conductors permanently attached to its component mounting surface. Electrically conductive leads extend between the light emitting segments of the display unit and the electrical conductors attached to the circuit board. The display unit includes a base supporting member to which the light emitting segments are attached in a desired configuration. The base member is preferably glued with an electrically conductive glue to an electrical conductor attached to the circuit board, thereby simultaneously physically connecting the base member directly and permanently to the circuit board and electrically connecting a common terminal of the light emitting segments to the electrical conductor on the circuit board. The circuit board is of sufficient size to allow the connection of other electronic components, such as integrated circuits and the like, to the electrical conductors on the circuit board. The electrical circuit assembly thus comprised is disclosed for exemplary use in conjuction with an electronic thermometer for taking temperatures of human beings.

13 Claims, 10 Drawing Figures

ELECTRICAL CIRCUIT BOARD WITH DIRECTLY ATTACHED DISPLAY UNIT AND METHOD OF ASSEMBLING SAME

BACKGROUND OF THE INVENTION

1. Field of the Invention

This invention relates to the assembly of electronic circuit elements, and more particularly to the direct and permanent fixture of a light emitting display unit to an electronic circuit board in the assembly. The electronic circuit assembly may be advantageously employed in conjunction with an electronic thermometer for measuring the temperature of human beings, as well as other devices.

2. Brief Description of Prior Art

Many currently available electronic devices employ relatively small visual displays. Visual displays are typically employed to communicate results or output information from the electronic device. One well known example of such an electronic device is a small hand-held electronic calculator. Such displays are and may be advantageously employed in a wide variety of other electronic devices, including electronic thermometers for measuring the temperature of human beings.

The typical method of providing a display in an electronic device is to assemble a separately-constructed, discrete display device to a circuit board. Assembly is generally accomplished by soldering or otherwise connecting the lead wires from the discrete display device to the electrical conductors of the circuit board. The cost of purchasing the separate display is relatively substantial, and in some circumstances, may exceed the cost of the circuit board and other electronic components used in assemblying the electronic device. Furthermore, the procedure of assembling the leads from the discrete display device to the conductors of the circuit board is time consuming and provides an opportunity for error should the leads be incorrectly connected. Other limitations and disadvantages relative to the assembly of discrete display devices to an electronic circuit board are known and appreciated as significant. In general, however, the various considerations, limitations and disadvantages present in the prior art can be more fully appreciated and easily recognized in light of the improvements and teachings of the present invention.

SUMMARY OF THE INVENTION

A general appreciation for the present invention can be obtained from an understanding of its general objective, which is to provide a new and improved electrical circuit assembly and method of assembling a circuit board wherein a display unit is directly and permanently connected to a circuit board. By such an arrangement, the use of a relatively costly, separately-constructed display device is avoided.

In accordance with the general aspects of the invention, at least one visual display unit is directly and permanently attached to the component mounting surface of a circuit board. The visual display unit includes a base supporting member upon which a plurality of light emitting elements, such as light emitting diode segments, are positioned to emit a desired visual configuration of light when energized. The component mounting surface of the circuit board encompasses a sufficiently large area to position and retain other electronic components, such as integrated circuits and the like, in addition to the display unit. Conventional electrical conductors are attached to the component mounting surface of the circuit board and extend thereover in predetermined electrically conductive paths between various components of the circuit board and each display unit. An electrically conductive path is established between the electrical conductors attached to the circuit board and the individual light emitting elements of the display unit preferably by an electrical lead extending therebetween.

A more complete understanding of the invention can be obtained from the appended claims, and from a description of a presently preferred embodiment of the invention taken in conjunction with a drawing consisting of a number of figures.

DESCRIPTION OF PREFERRED EMBODIMENT

Figure 1:
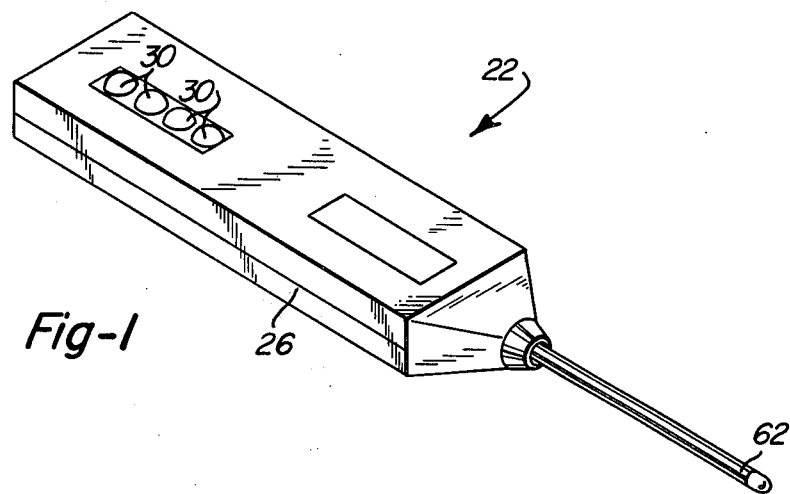
FIG. 1 is a perspective view of a hand-held electronic thermometer used for taking the temperature of individuals, in which the present invention can be advantageously incorporated.
Figure 2:
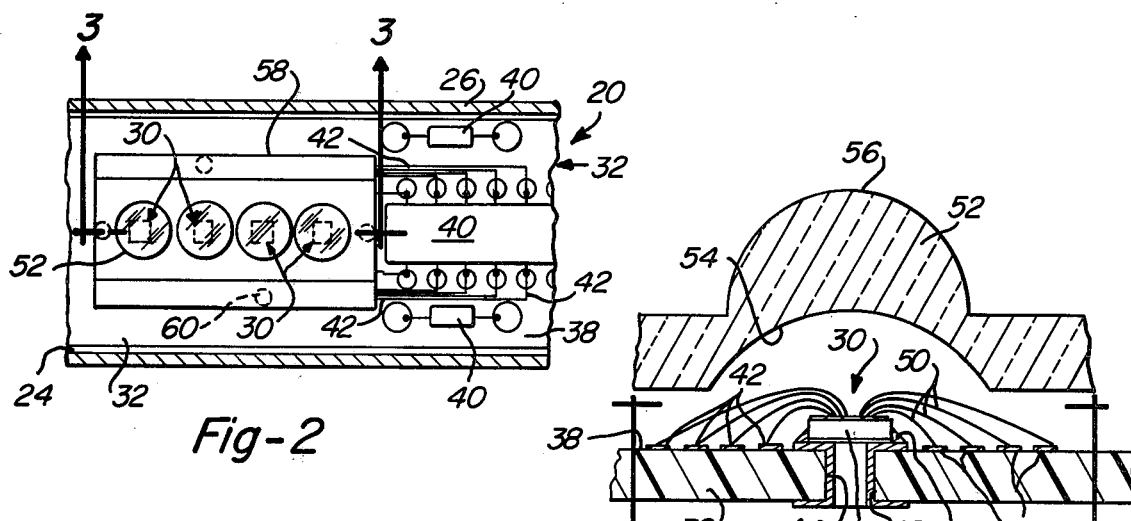
FIG. 2 is a partial plan view of FIG. 1 with a portion of a housing member of the electronic thermometer removed to better illustrate details of a major portion of an electrical circuit assembly according to the present invention.

The concepts of the present invention, as it relates to an electrical circuit assembly 20 and a method of assembling an electrical circuit, are disclosed in conjunction with an electronic hand-held thermometer 22 for taking the temperature of a human being, which is illustrated in FIG. 1. FIG. 2 illustrates the general concepts of the electrical circuit assembly 20, which is shown received within the interior portion 24 of a hollow housing member 26 of the electronic thermometer 22.

Figure 4:
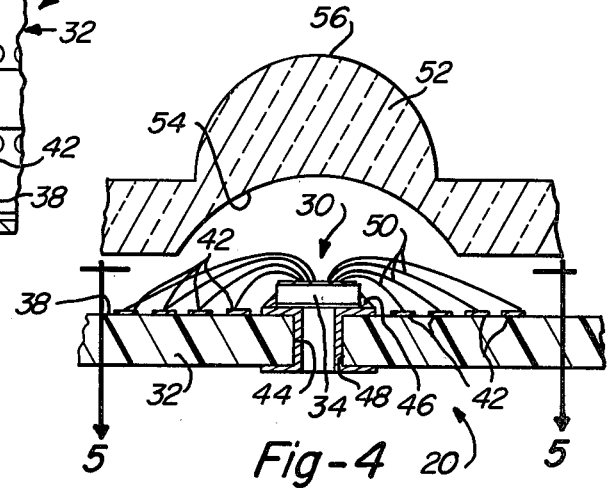
FIG. 4 is an enlarged vertical section view taken substantially in the plane of line 4—4 of FIG. 3.
Figure 5:
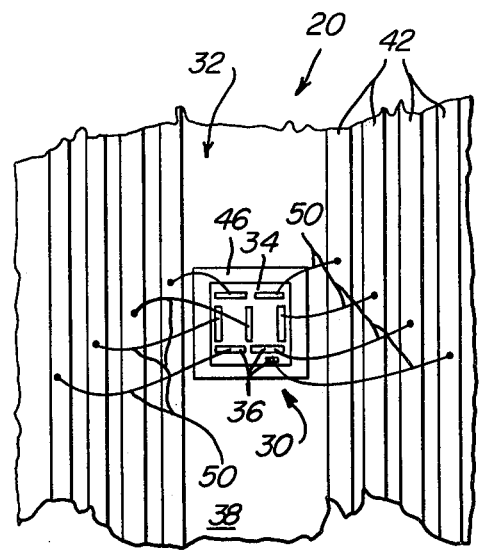
FIG. 5 is a horizontal section view taken substantially in the plane of line 5—5 of FIG. 4.

Details of the electrical circuit assembly 20 can be better understood by reference to FIGS. 2, 3, 4 and 5. The electrical circuit assembly 20 includes at least one display unit 30 directly and permanently attached to a circuit board 32. Each display unit 30 includes a base supporting member 34 for positioning and supporting at least one light emitting element such as a semi-conductive light emitting diode (LED) segment 36. Preferably, the LED segments 36 are arranged as a conventional seven-segment display arrangement providing the figure eight configuration of emitted light (FIG. 5). An LED segment can also be utilized for a decimal point if desired. As used herein, the term "display unit" is not intended to include the conventional prepackaged, separately-constructed, incapsulated, and discrete display device having leads extending from the incapsulating package for the purpose of electrically connecting the internal elements of the display package to a circuit board.

The circuit board 32 is preferably of conventional construction having a generally planar component mounting surface 38. It is also typical that the opposite parallel planar surface of the circuit board can also serve as a component mounting surface, but such use is not specifically illustrated herein. The component mounting surface 38 is of substantially larger surface area than the surface area encompassed by the display units 30 when attached to the circuit board. The larger component mounting surface of the circuit board is utilized for mounting and positioning various electronic components illustrated generally at 40, such as integrated circuits, transistors, resistors, capacitors and the like. Conventional electrical conductors 42 are attached to the component mounting surface 38 and provide electrical connections between various elements and the leads of the various elements attached to the circuit board 32. The electrical conductors and the method by which they are attached to the circuit board are both conventional in the art. As is also conventional in the art, apertures may be formed into or through the circuit board 32 and formed with an electrical conductor for establishing a conductive path from one component mounting surface of the circuit board to the other component mounting surface on the other side of the circuit board. The apertures 44 also receive the electrical connecting leads of various circuit elements and components to be soldered or otherwise connected to the electrical conductors 42. The apertures thereby serve as means for positioning and retaining the electronic components to the circuit board, as is known in the art.

As is best shown in FIGS. 4 and 5, the base member 34 of the display unit 30 is directly and permanently attached to the circuit board 32, preferably by a glue substance 46. The display unit 30 can be positioned at any desired location on the circuit board, but in some circumstances, a common electrical connection between the LED segments and one of the electrical conductors 42 is advantageous. This common electrical connection can be established by commonly connecting one terminal of each LED segment to a base member having conductive characteristics and thereafter gluing the base member 34 directly to an electrical conductor 42 by an electrically conductive glue substance such as electrically conductive epoxy. One such connection arrangement is best illustrated in FIG. 4 wherein the base supporting member 34 is directly glued to an electrically conductive eyelet 48 formed in the aperture 44. Of course, an electrical conductor 42 is connected with the eyelet 48 to complete the current flow path from the display unit 30.

To connect the other terminal each LED segment 36 to an electrical conductor 42, an electrical conductive lead 50 is connected between each LED segment and a conductor 42. The leads 50 are arched to extend between the LED segments 36 and the conductors 42 and are thereby known as flying leads. One end of each flying lead is electrically connected to the LED segment by conventional means, and the other end of each flying lead 50 is connected to the electrical conductor 42 attached to the circuit board 32. In this manner, an electrically conductive path is established from the conductors 42 to the LED segments 36 and from the display unit 30 by means of the common electrical connection of the LED segments to the eyelet 48, for example.

Figure 6:
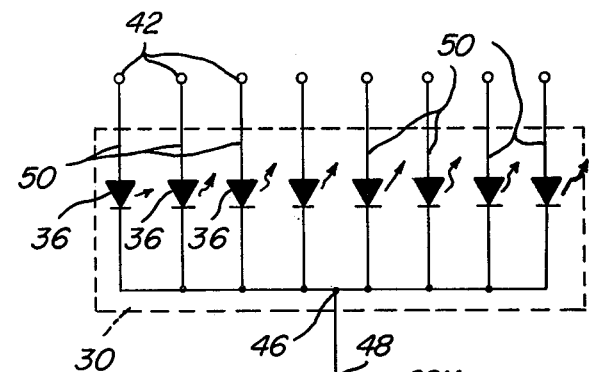
FIG. 6 is a schematic diagram of light emitting diode segments comprising a part of a display unit of the present invention.

A better understanding of the connection of each individual LED segment 36 can be understood by reference to FIG. 6. One terminal of each LED segment 36 is connected by the flying lead 50 to the electrical conductor 42 attached to the circuit board. The other terminal of each LED segment 36 is commonly connected within the base supporting member 34 of the display unit 30. The common connection is electrically connected to a conductor such as the eyelet 48 with an electrically conductive glue substance 46. When the LED segments 36 are energized by a supply of current supplied through the electrical conductors 42, the LED segments emit light. The physical configuration of the LED segments 36 on the display unit, and the selective energization of certain of these segments provides a visual display configuration of the type desired. With a seven segment display arranged as illustrated in FIG. 5, all digits from 0 to 9 can be readily displayed. Other arrangements can be utilized for alphabetic indications.

Figure 3:
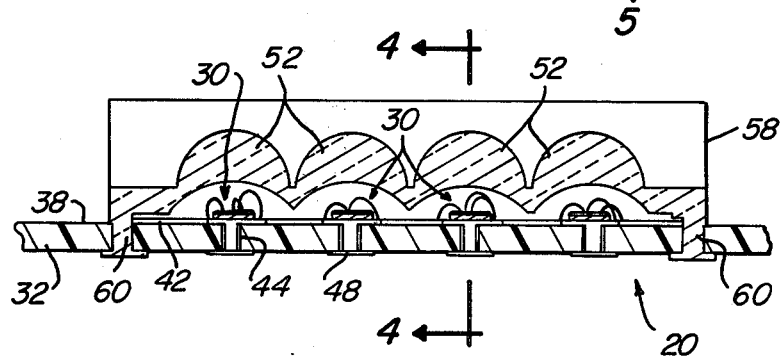
FIG. 3 is an enlarged section view taken substantially in the plane of line 3—3 of FIG. 2.

To magnify the light configuration emitted by the LED segments from each display unit 30, a magnifying lens 52 is positioned generally above each display unit, as is best shown in FIGS. 2, 3 and 4. Each magnifying lens is formed of a clear material such as plastic and includes an inner contoured surface 54 spaced from the display unit 30 and an outer contoured surface 56. The surfaces 54 and 56 define the magnifying characteristics of the lens 52. If desired, a plurality of magnifying lenses 52 can be formed as an assembly 58. The lens assembly 58 is positioned on the circuit board 32 whereby each individual magnifying lens 52 is located above one display unit 30. The lens assembly 58 is attached to the circuit board 32 by conventional means, such as glue or by use of integral tabs 60 (FIG. 3) projecting through apertures formed in the circuit board 32. The ends of the tabs 60 projecting through the apertures are then bent or distorted over on the surface of the circuit board opposite the surface 38.

Assembly of the light emitting display unit 30 with the circuit board 32 typically begins by obtaining the individual display units and by obtaining the circuit board having its conductors 42 formed thereon. The display unit is then directly and permanently attached to the component mounting surface 38 of the circuit board, as for example with the electrically conductive glue substance 46. An electrical path is established between each light emitting element or LED segment 36 and the electrical conductors 42 attached to the circuit board, by use of the flying leads 50, for example.

Figure 7:
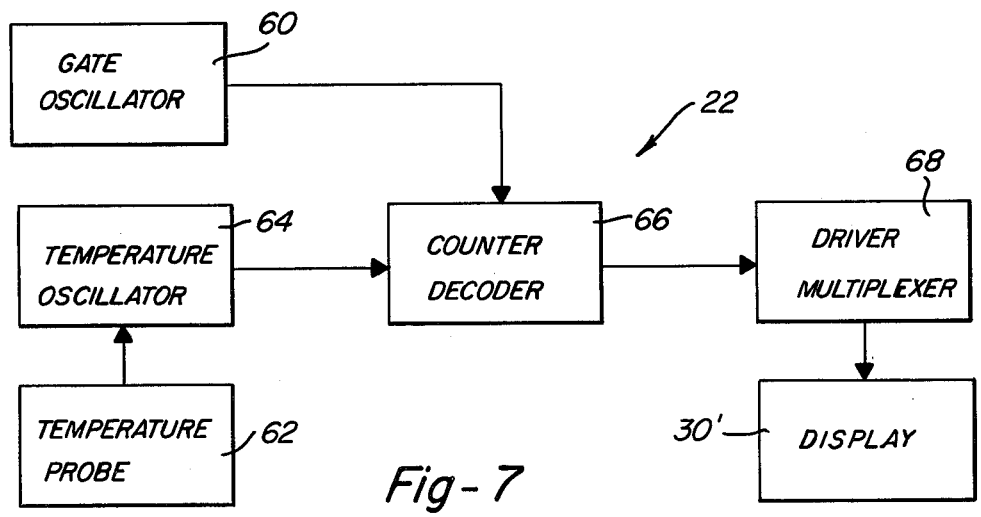
FIG. 7 is a block diagram of an electronic circuit for the electronic thermometer of FIG. 1, which also illustrates use of various components in addition to the display unit in accordance with certain aspects of the invention.
Figure 8A:
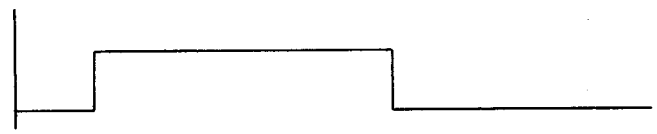
FIGS. 8a, 8b and 8c are exemplary waveform diagrams on a common time axis illustrating the operation of certain portions of the elements illustrated in FIG. 7.
Figure 8B:
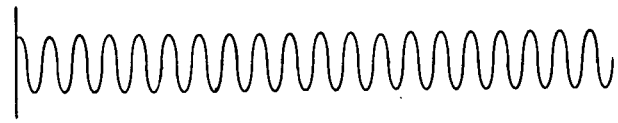
Figure 8C:
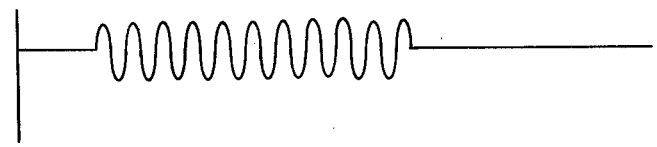

In the example of the electronic thermometer 22, its electronic components are attached to the circuit board at positions spaced from the display units. These components are illustrated in FIG. 7, and include a gate oscillator 60 operating at a relatively low gate frequency and supplying a square wave output illustrated in FIG. 8a. A temperature probe 62 is electrically connected to a temperature oscillator 64 positioned on the circuit board. The temperature probe 62 provides a resistance characteristic dependent upon the temperature it senses. The resistance of the temperature probe 62 serves as an input to the temperature oscillator, 64, and the output frequency of the temperature oscillator 64 is related to the resistance and hence temperature of the probe. The output frequency of the temperature oscillator is illustrated in FIG. 8b, and is of considerably greater frequency than the gate frequency illustrated in FIG. 8a. A counter decoder 66 is connected to receive the gate frequency and the temperature frequency from the gate and temperature oscillators 60 and 64 respectively. The counter decoder 66 counts the number of cycles of the temperature frequency during one cycle of the gate frequency, as is shown by FIG. 8c. The count thus derived is decoded into signals indicative of the count. A driver multiplexer 68 is connected to receive the signals indicative of the count and to provide signals to a display 30' in accordance with the count. The display 30' comprises one or more of the display units 30 previously described. If the display 30' includes more than one display unit 30, the driver multiplexer 68 multiplexes signals between each of the display units 30 whereby each individual display unit receives signals for energizing its light emitting elements in accordance with its output to be presented. Of course, the driver multiplexer 68 supplies its signals to the electrical conductors 42 attached to the circuit board, and the individual LED segments are energized in accordance with the conductors 42 energized. Multiplexing occurs by selectively establishing a current flow path from the common electrical connection of each display unit, as through the eyelet 48. In this manner, the electronic component elements of the thermometer 22 cooperate with the display units 30 to provide an operable electronic device.

It is apparent that the elements of FIG. 7 form one example of the electronic component means adapted for receiving an input signal representative of the information to be communicated by the display (for example, the resistance of probe 62), and for conditioning the input signal into an output signal of different form than the input signal and of a form suitable for directly activating the display (for example, such as by operation of elements 60, 64, 66 and 68), and for supplying the output signal (for example, the output of the multiplexer 68).

It is apparent that many advantages result from directly connecting a display unit to the circuit board. The cost of the circuit assembly can be reduced since purchase of a discrete and incapsulated conventional display device is avoided. In many instances, the complete circuit assembly 20 can be manufactured on a single circuit board, and can be more easily retained within the interior of an electronic device. Many other advantages naturally result by use of the present invention.

Although the present invention has been described with a certain degree of particularity, it should be understood that the present disclosure has been made by way of example and that changes in details of the structure may be made without departing from the spirit and scope of the invention.

I claim as my invention:

1. An electrical circuit assembly including a display and electronic component means operatively electrically connected for activating the display, said circuit assembly comprising:

at least one display unit including at least one light emitting semiconductive element and a base support member to which the light emitting element is permanently attached, each semiconductive element having a pair of electrical terminals to which electrical energy is applied to thereby cause light to be emitted therefrom, each light emitting element being positioned on the base member to communicate visual information when energized;

a single electrical circuit board for said assembly having a component mounting surface of substantially larger area than said display unit and arranged to operatively support and position said display unit and said electronic component means of said assembly therefrom;

a plurality of electrical conductors permanently attached to the component mounting surface of said circuit board;

affixing means for directly and permanently affixing the base member of said display unit to the component mounting surface of said circuit board and for simultaneously directly electrically connecting a first of the pair of the terminals of at least one of said semiconductive elements to an electrical conductor;

at least some of said electrical conductors being positioned on said component mounting surface proximate to said display unit and extending to positions on said component mounting surface separated from said display unit;

means for electrically connecting the second terminal of at least one semiconductive element to an electrical conductor proximate to said display unit;

electronic component means exclusive of said display unit and said electrical conductors positioned from said component mounting surface of said circuit board at a location separated from said display unit, said electronic component means adapted for receiving an input signal representative of information to be communicated by said display, and for conditioning the input signal into an output signal of different form than the input signal and of form suitable for directly activating a semiconductive element, and for supplying the output signal, said electronic component means including at least one electrical lead conductor extending therefrom over which the output signal is supplied; and means electrically connecting the lead conductor of said electronic component means to at least one electrical conductor at a position separated from said display unit.

2. An invention as recited in claim 1 wherein:
the base support member of said display unit is electrically conductive and the first terminal of said light emitting semiconductive element is electrically connected to said base member.

3. An invention as recited in claim 2 wherein:
said affixing means connects the base support member of said display unit directly contacting relation to an electrical conductor attached proximate said display unit on the component mounting surface of said circuit board.

4. An invention as recited in claim 3 wherein said affixing means comprises an electrically conductive glue substance.

5. An electrical circuit assembly as recited in claim 3, wherein:
a plurality of light emitting semiconductive elements are attached to the base member of said display unit,
the plurality of light emitting elements is at least seven, and
the seven light emitting elements are positioned on said display unit to emit light generally in the form of a figure eight.

6. An electrical circuit assembly as recited in claim 1 further comprising:

lens means attached to said circuit board and extending generally above each of said display units for magnifying the size of the light configuration information emitted from said light emitting elements.

7. An electrical circuit assembly as recited in claim 1 wherein said means for electrically connecting the lead conductor of said electronic component means to at least one electrical conductor at a position separated from said display unit comprises at least one aperture formed adjacent an electrical conductor attached to said circuit board and extending into said circuit board.

8. An electrical circuit assembly comprising:
   at least one display unit including a plurality of individual light emitting elements, said light emitting elements each include a light emitting diode segment;
   an electrical circuit board having a component mounting surface of substantially larger area than said display unit;
   means for directly and permanently affixing said display unit to the component mounting surface of said circuit board;
   a plurality of electrical conductors permanently attached to the component mounting surface of said circuit board, at least a few of said electrical conductors being positioned on said component mounting surface proximate to said display unit and extending to positions on said component mounting surface separated from said display unit;
   means for electrically connecting each light emitting diode segment of said display unit to an electrical conductor attached proximately to said display unit; and
   means associated with said circuit board for electrically connecting an electronic component other than said display unit to at least one electrical connector at a position on the component mounting surface separated from said display unit;
   said display unit further comprising:
      a base support member upon which said light emitting diodes are supported,
      means associated with said base member for providing a common electrical connection to each of said light emitting diodes, and
      means for electrically connecting said common connection to at least one of said electrical conductors attached to said circuit board.

9. An electrical circuit assembly as recited in claim 8 wherein said means for electrically connecting said common connection to at least one of said electrical conductors comprises an electrically conductive glue substance.

10. An electrical circuit assembly as recited in claim 8 wherein the base member of said display unit is attached to said circuit board by an electrically conductive glue substance, and said electrically conductive glue substance extends between said common connection and at least one electrical conductor attached to said circuit board.

11. An electronic thermometer utilizing an electrical circuit assembly therein, said electrical circuit assembly comprising:
   at least one display unit including a plurality of individual light emitting elements, said light emitting elements each include light emitting diode segments,
   an electrical circuit board having a component mounting surface of substantially larger area than said display unit,
   means for directly and permanently affixing said display unit to the component mounting surface of said circuit board,
   a plurality of electrical conductors permanently attached to the component mounting surface of said circuit board, at least a few of said electrical conductors being positioned on said component mounting surface proximate to said display unit, and at least a few of said electrical conductors extending to positions on said component mounting surface separated from said display unit,
   means for electrically connecting each light emitting diode segments of said display unit to an electrical conductor attached proximate to said display unit,
   at least one electronic component other than said display unit positioned on said component mounting surface of said circuit board and separated from said display unit, said electronic component including at least one electrical lead conductor extending therefrom, and
   means electrically connecting said component lead conductor to at least one electrical conductor attached to said circuit board at a position separated from said display unit.

12. An invention as recited in claim 11 wherein:
   said electronic thermometer comprises a housing member, a temperature sensing probe extending from the housing member, and means for electrically connecting said probe to said electrical component attached to said circuit board, and
   said electrical component includes means for electrically determining the temperature of said probe, and means for supplying signals representative of the temperature determined to said electrical conductors attached to said circuit board and electrically connected with said display unit.

13. An electronic circuit assembly as recited in claim 12 wherein said electrical component attached to said circuit board comprise:
   a gate oscillator operating at a gate frequency,
   a temperature oscillator electrically connected to said probe and operating at a temperature frequency, the temperature frequency being related to the temperature of said probe,
   counting means electrically connected to receive the gate frequency and temperature frequency for counting the cycles of said temperature frequency during a portion of one cycle of said gate frequency,
   decoder means electrically connected for decoding the count of said counter means into signals indicative of said count, and
   means electrically connected for supplying energizing signals to said display unit in accordance with the signals indicative of the count from said decoder, said energizing signals being supplied over said electrical connectors attached to said circuit board.

* * * * *